(12) United States Patent
Sakata et al.

(10) Patent No.: US 8,506,128 B2
(45) Date of Patent: Aug. 13, 2013

(54) LIGHT SOURCE DEVICE, ILLUMINATION SYSTEM, AND PROJECTOR

(75) Inventors: Hidefumi Sakata, Tatsuno-cho (JP);
Susumu Aruga, Shiojiri (JP); Takayuki Matsubara, Chino (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 456 days.

(21) Appl. No.: 12/788,504

(22) Filed: May 27, 2010

(65) Prior Publication Data

US 2010/0302510 A1  Dec. 2, 2010

(30) Foreign Application Priority Data

Jun. 2, 2009  (JP) ................................. 2009-133250

(51) Int. Cl.
*F21V 7/00* (2006.01)
(52) U.S. Cl.
USPC ...... 362/298; 362/346; 362/296.05; 362/263; 362/268
(58) Field of Classification Search
USPC ............ 362/341, 346, 347, 261, 263, 296.01, 362/297, 298, 514–518, 296.05, 268
See application file for complete search history.

(56) References Cited

U.S. PATENT DOCUMENTS

| | | | | |
|---|---|---|---|---|
| 3,609,340 A | * | 9/1971 | Habro | 362/303 |
| 4,680,679 A | * | 7/1987 | Dilouya | 362/518 |
| 4,956,759 A | * | 9/1990 | Goldenberg et al. | 362/297 |
| 5,560,699 A | * | 10/1996 | Davenport et al. | 362/558 |
| 6,115,183 A | | 9/2000 | Sarayeddine et al. | |
| 6,419,381 B2 | * | 7/2002 | Nino et al. | 362/518 |
| 6,672,740 B1 | * | 1/2004 | Li | 362/298 |
| 6,854,864 B2 | * | 2/2005 | Li | 362/304 |
| 7,020,368 B2 | * | 3/2006 | Li | 385/43 |
| 7,040,768 B2 | | 5/2006 | Fujisawa et al. | |
| 7,213,944 B2 | * | 5/2007 | Shimaoka et al. | 362/299 |
| 2002/0039293 A1 | * | 4/2002 | Li | 362/302 |
| 2002/0141191 A1 | * | 10/2002 | Li | 362/297 |
| 2004/0252512 A1 | | 12/2004 | Sekiguchi et al. | |
| 2006/0203497 A1 | * | 9/2006 | Shimaoka et al. | 362/346 |

FOREIGN PATENT DOCUMENTS

| | | |
|---|---|---|
| JP | 09-034011 | 2/1997 |
| JP | 11-143378 A | 5/1999 |
| JP | 2001-109068 | 4/2001 |
| JP | P3350003 | 9/2002 |
| JP | 2003-043580 A | 2/2003 |
| JP | P3923560 | 3/2007 |
| WO | 2004/104689 A1 | 12/2004 |

* cited by examiner

*Primary Examiner* — Bao Q Truong
(74) *Attorney, Agent, or Firm* — Maschoff Brennan

(57) ABSTRACT

A light source device includes: a light source which emits light; a first reflector which surrounds a part of the light source and reflects the light emitted from the light source in the direction of an optical axis; and a second reflector which surrounds at least a part of the light source different from the part surrounded by the first reflector and reflects the light emitted from the light source toward the first reflector, wherein the position of a convergence spot of the light reflected by the second reflector is displaced from the position of an emission spot of the light source at least in the direction of a plane perpendicular to the direction of the optical axis.

11 Claims, 11 Drawing Sheets

LIGHT SOURCE DEVICE, ILLUMINATION SYSTEM, AND PROJECTOR

BACKGROUND

1. Technical Field

The present invention relates to a light source device, an illumination system, and a projector.

2. Related Art

A projector is known as an apparatus capable of displaying a large-screen image. Atypical projector includes an illumination system, an image forming device, and a projection lens, for example. Illumination light emitted from the illumination system forms an image by the function of the image forming device. The image is expanded and projected by the projection lens such that a large-screen image can be more easily produced than a direct viewing type image display apparatus.

A known light source device included in the illumination system has a light source such as a high-pressure mercury lamp, and a reflector. The reflector has a shape of a paraboloid of revolution or spheroid whose focus is located at the position of the light source. The reflector used in related-art is a full-surrounding type which has a reflection surface surrounding the entire circumference of the light source around the revolution axis containing a light emission point. According to this structure, light emitted from the light source is reflected by the reflector and extracted to the outside of the light source device.

There are several points currently expected for the projector, including size reduction of the apparatus, lower power consumption, and high-luminance image display. Japanese Patent Nos. 3350003 and 3923560 propose technologies for reducing the size of the projector.

According to Japanese Patent Nos. 3350003 and 3923560, a light source device includes a first reflector, a second reflector, and a light source. The reflection surface of the first reflector is constituted by a part of a spheroid as a division of the spheroid cut along division surfaces containing the revolution axis. The reflection surface of the second reflector is a part of a sphere as a division of the sphere cut along the same division surfaces. The reflection surface of the first reflector is disposed to oppose to the reflection surface of the second reflector. One focus of the reflection surface of the first reflector coincides with a focus of the second reflector and a light emission point of the light source.

Light emitted from the light source toward the second reflector is reflected and bent by the second reflector, and then passes the light emission point and enters the first reflector. Light emitted from the light source toward the first reflector travels to the outside of the light source device together with the light having passed the second reflector.

According to the technologies shown in Japanese Patent Nos. 3350003 and 3923560, the second reflector has substantially the same size as that of the light source. Thus, the size of the light source device can be decreased to approximately half. Moreover, a projection area of the reflection surface of the first reflector projected on a plane perpendicular to the optical axis is approximately half of that area of the full-surrounding type reflector. Thus, the spot size of the light extracted from the light source device becomes approximately half. Accordingly, the sizes of optical elements such as an image forming device, a projection lens, and lenses receiving light from the light source device can be reduced.

While the projector shown in Japanese Patent Nos. 3350003 and 3923560 is considerably compact, the following points need to be improved in view of reduction of light loss.

It is known that a discharge-type light source emits light based on a light emission theory described herein. Discharge gas sealed into an arc tube (discharge tube) collides with electrons produced by arc discharge. As a result, the discharge gas is partially excited, and is partially ionized to become plasma. The exited discharge gas returns to ground state or metastable state, thereby emitting light corresponding to the energy difference between the exited state and the returned state. The discharge gas as plasma recombines with electrons and emits light corresponding to combination energy.

According to the light source device shown in Japanese Patent Nos. 3350003 and 3923560, the luminance distribution of the light reflected by the second reflector almost agrees with the luminance distribution of the light source image with respect to the pattern and position. That is, a higher luminance portion of the light reflected by the second reflector enters a higher plasma density area. In this case, light loss becomes larger than that of the light source device having the full-surrounding type reflector, and therefore problems such as difficulty in displaying high-luminance images and higher power consumption of the projector arise.

SUMMARY

It is an advantage of some aspects of the invention to provide a light source device which is compact and can reduce light loss. It is another advantage of some aspect of the invention to provide an illumination system which is compact and can produce illumination light having high brightness with low power consumption. It is a further advantage of some aspects of the invention to provide a projector which is compact and can display a high-luminance image with low power consumption.

A light source device according to a first aspect of the invention includes: a light source which emits light; a first reflector which surrounds a part of the light source and reflects the light emitted from the light source in the direction of an optical axis; and a second reflector which surrounds at least a part of the light source different from the part surrounded by the first reflector and reflects the light emitted from the light source toward the first reflector. The position of a convergence spot of the light reflected by the second reflector is displaced from the position of an emission spot of the light source at least in the direction of a plane perpendicular to the direction of the optical axis.

According to this structure, light emitted from the light source toward the second reflector is reflected by the second reflector and reaches the first reflector. Then, the light is extracted in the direction of the optical axis together with the light emitted from the light source toward the first reflector. In this case, approximately the same amount of light can be supplied even when the second reflector is smaller than the first reflector. Thus, the light source device can be easily made compact. Generally, the central portion of the emission spot has higher plasma density than the peripheral portion of the emission spot, and thus has a higher light absorption rate. Since the position of the convergence spot of the light reflected by the second reflector is shifted from the central portion of the emission spot of the light source, light loss produced by absorption of light by plasma at the central portion of the emission spot can be reduced.

Accordingly, the light source device having this structure can be made compact and can reduce light loss.

The light source comprises a pair of electrodes disposed away from each other along a predetermined light source axis with the emission spot positioned between the pair of the electrodes. In this case, the light source device may be configured such that the luminance maximum portion of the convergence spot is displaced from the luminance maximum portion of the emission spot on an inspection plane containing the center of gravity of luminance of the convergence spot and the light source axis.

According to this structure, it is considered that the luminance maximum portion almost agrees with the area where the plasma density becomes the maximum. Since the luminance maximum portion of the convergence spot is shifted from the luminance maximum portion of the emission spot, the amount of light absorbed by plasma is lowered. Thus, reduction of light loss can be achieved.

Comparing the displacement of the luminance maximum position of the convergence spot from the luminance maximum position of the emission spot in a first direction as one of two directions independent from each other on the inspection plane and that displacement in a second direction as the other direction, it may be configured such that the displacement in the first direction having a relatively large rate of luminance change at the emission spot is larger than the displacement in the second direction having a relatively small rate of luminance change at the emission spot.

According to this structure, the displacement of the luminance maximum position of the emission spot from the luminance maximum position of the convergence spot is large in the direction in which the rate of luminance change at the emission spot is high. In this case, the drop of luminance of the convergence spot at a portion corresponding to the emission spot from the maximum luminance of the convergence spot can effectively increase in proportion to the displacement. Consequently, the amount of light passing through the area having relatively high plasma density can be effectively lowered, and thus the amount of light absorbed by plasma can be effectively decreased in proportion to the displacement. Accordingly, the shift of the convergence spot from the emission spot can be reduced to the minimum, and thus the light distribution characteristics of the entire light emitted from the light source device can be improved.

It may be configured such that a range corresponding to a half value width of luminance distribution of the convergence spot does not overlap with a range corresponding to a half value width of luminance distribution of the emission spot on a crossover line along which the plane perpendicular to the light source axis crosses the inspection plane.

When the range corresponding to the half value width of the luminance distribution of the convergence spot does not overlap with the range corresponding to the half value width of the luminance distribution of the emission spot, the proportion of the light reflected by the second reflector and passing through plasma is considerably lowered. Thus, the amount of light absorbed by plasma can be considerably reduced.

It may be configured such that a light receiving area of the first reflector for receiving light from the light source is shaped substantially symmetric with respect to a symmetry plane containing a light emission point of the light source. In this case, a light receiving area of the second reflector for receiving light from the light source may be shaped substantially symmetric with respect to the symmetry plane, and the center of gravity of luminance of the convergence spot may be displaced from the light emission point within the symmetry plane.

According to this structure, each of the light receiving areas of the first and second reflectors for receiving light from the light source is shaped substantially symmetric with respect to the symmetry plane containing the light emission point. Thus, the luminance distribution of light extracted from the light source device becomes symmetric with respect to the symmetry plane.

It may be configured such that a focus position of the first reflector almost coincides with a light emission point of the light source, and that a focus position of the second reflector is displaced from the focus position of the first reflector.

According to this structure, the focus position of the second reflector is located at a position different from the position of the light emission point. Thus, the convergence spot can be separately positioned from the emission spot.

It may be configured such that a focus position of the second reflector almost coincides with a focus position of the first reflector, and that the focus position of the first reflector is displaced from a light emission point of the light source.

According to this structure, the focus position of the second reflector is located at a position different from the position of the light emission point. Thus, the convergence spot can be separately positioned from the emission spot. Since the focus position of the second reflector almost agrees with the focus position of the first reflector, the symmetry of the luminance distribution of light extracted from the light source device can be improved.

It may be configured such that a focus position of the first reflector, a focus position of the second reflector, and a light emission point of the light source are disposed independently from one another.

According to this structure, the focus position of the second reflector is located at a position different from the position of the light emission point. Thus, the convergence spot can be separately positioned from the emission spot. Moreover, the luminance distribution of indirect light reflected by the second reflector and indirectly entering the first reflector can be designed independently from the luminance distribution of direct light directly entering the first reflector from the light source. Since the luminance distribution of the light extracted from the light source device has an overlapped pattern of the luminance distribution of the direct light and the luminance distribution of the indirect light, the luminance distribution of the extracted light can be designed with a higher degree of freedom.

An illumination system according to a second aspect of the invention includes: the light source device of the first aspect of the invention; a luminance equalizing element which contains a plurality of lenses and equalizes luminance distribution of light emitted from the light source device; and a polarization converting element which contains a plurality of polarization converting cells for equalizing the polarization condition of light received from the luminance equalizing element. The lenses are disposed in one-to-one correspondence with the polarization converting cells and converge light passing through the lenses at light entrance areas of the polarization converting cells. The displacement of the convergence spot from the emission spot is determined such that light having passed the second reflector and light having entered the first reflector directly from the light source can be supplied to the light entrance areas of the polarization converting cells in the light source device.

The light source device according to the first aspect of the invention is made compact and reduces light loss. Thus, the illumination system of the second aspect of the invention becomes small-sized and produces high-luminance light with low power consumption. Since the displacement of the convergence spot from the emission spot is determined such that the light having passed the second reflector and the light having entered the first reflector directly from the light source can be supplied to the light entrance areas of the polarization converting cells, loss of light due to entering a portion outside the light entrance areas is reduced. As a result, light can be used with high efficiency.

A projector according to a third aspect of the invention includes: an illumination system including the light source device of the first aspect of the invention or the illumination system of the second aspect of the invention; an image forming device which forms an image by using light supplied from the illumination system; and a projection system which projects the image formed by the image forming device.

The illumination system including the light source device according to the first aspect of the invention or the illumination system according to the second aspect of the invention is made compact and produces high-luminance light with low power consumption. Thus, the projector according to the third aspect of the invention becomes small-sized, and produces high-luminance images with low power consumption.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments according to the invention are hereinafter described with reference to the drawings. The technical scope of the invention is not limited to the embodiments described herein, but may be practiced otherwise without departing from the scope and spirit of the invention. In the figures referred to in the following explanation, some sizes and reduction scales of the structures shown in the figures are different from those of the actual structures for easy understanding of the characteristic parts. The same reference numbers are given to similar constituent elements in the respective embodiments, and the same detailed explanation is not repeated in some cases.

First Embodiment

Figure 1:
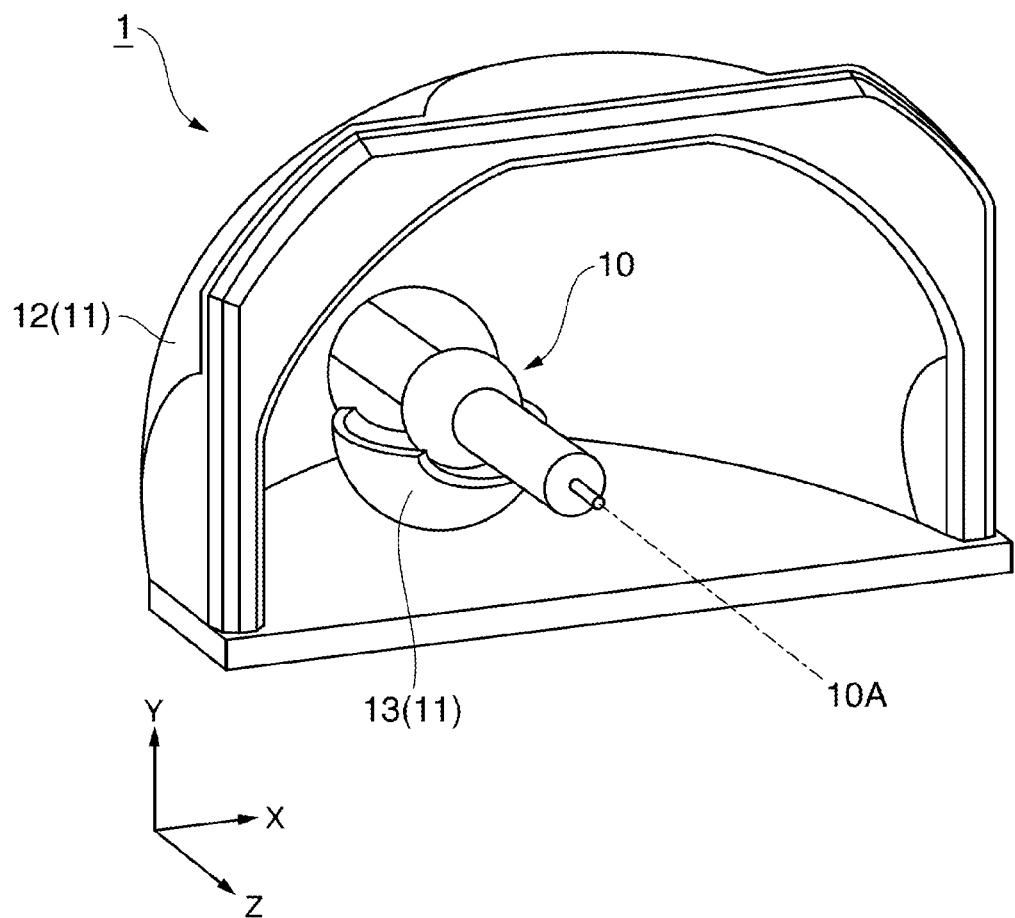
FIG. 1 is a perspective view illustrating the general structure of a light source device according to a first embodiment.

FIG. 1 is a perspective view illustrating the general structure of a light source device 1 according to a first embodiment of the invention.

As illustrated in FIG. 1, the light source device 1 includes alight source 10 and a reflector 11. The reflector 11 has a first reflector 12 and a second reflector 13. Each of the first reflector 12 and the second reflector 13 has a concave reflection surface disposed to oppose to each other. The light source 10 is positioned in an area surrounded by the first reflector 12 and the second reflector 13. The light source 10 extends substantially in the axial direction of a light source axis (hereinafter referred to as lamp axis) 10A, and has a substantially symmetric shape with respect to the lamp axis 10A. The optical axis of the light source device 1 extends substantially parallel with the lamp axis 10A.

The positional relationship between the respective components is now explained based on an XYZ rectangular coordinate system established as shown in FIG. 1. According to the XYZ rectangular coordinate system, a Z direction corresponds to a direction parallel with the optical axis of the light source device 1, i.e., a direction parallel with the lamp axis 10A, and X and Y directions correspond to directions crossing each other at right angles within a plane perpendicular to the optical axis. The main light receiving portion of the second reflector 13 is disposed on one of two areas interposing a predetermined plane containing the lamp axis 10A (hereinafter referred to as boundary plane as well). In this embodiment, the normal direction of the boundary plane corresponds to the Y direction. The reflection surface of the second reflector 13 is opposed to the reflection surface of the first reflector 12 in the Y direction.

Figure 2A:
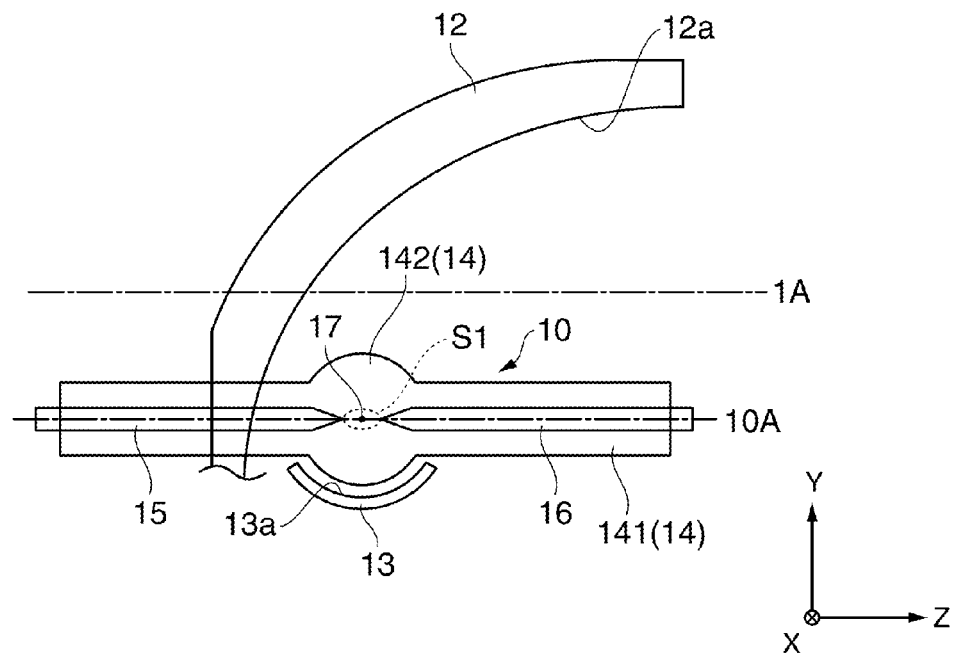
FIGS. 2A and 2B are a cross-sectional view and a plan view, respectively, of the light source device according to the first embodiment.
Figure 2B:
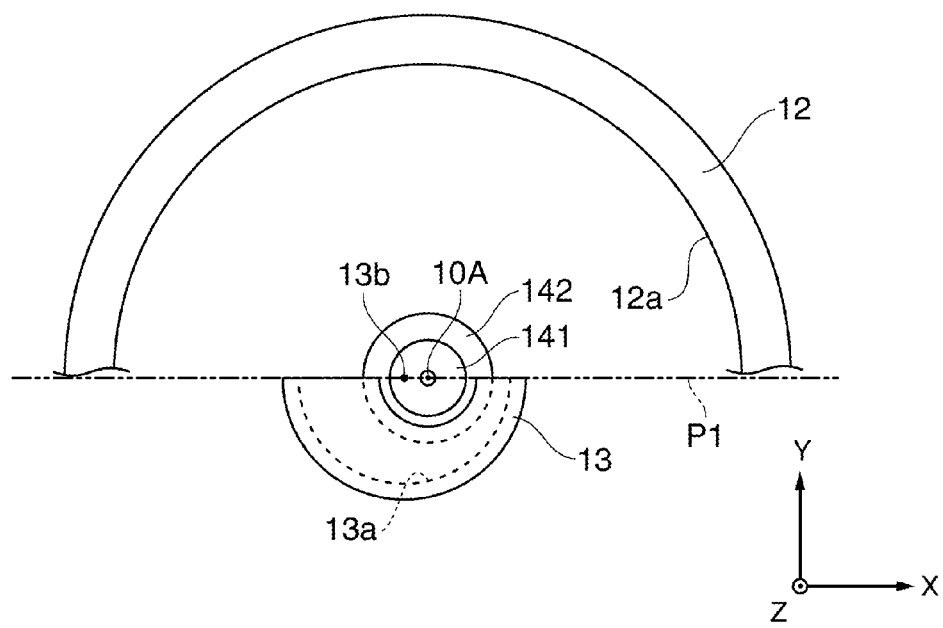

FIG. 2A schematically illustrates the cross-sectional structure of the light source device 1 cut along a plane containing the lamp axis 10A and parallel with the YZ plane. FIG. 2B is a plan view showing the positional relationship between the constituent elements of the light source device 1 in a plane perpendicular to the lamp axis 10A (front view as viewed in the +Z direction). FIG. 2B schematically illustrates a reflection surface 13a on a cross section passing a light emission point 17 and crossing the lamp axis 10A at right angles.

The light source 10 is constituted by a lamp source such as a high-pressure mercury lamp, a metal halide lamp, and a xenon lamp. As illustrated in FIG. 2A, the light source 10 includes an arc tube 14, and a pair of electrodes 15 and 16 sealed into the arc tube 14. The arc tube 14 is a hollow component into which discharge gas, inert gas and others are sealed.

The electrodes 15 and 16 are made of tungsten, for example. The electrodes 15 and 16 extend in a direction parallel with the lamp axis 10A (Z direction) from positions spaced away from each other by a predetermined length in the Z direction. The electrodes 15 and 16 are electrically connected with the power source via not-shown wires. The arc tube 14 has a cylindrical portion 141 covering the electrodes 15 and 16 and extending in the direction of the lamp axis 10A, and a spherical portion 142 whose center is located at the central portion between the electrodes 15 and 16.

When voltage is applied between the electrodes 15 and 16, arc discharge is generated therebetween. The discharge gas within the arc tube 14 collides with electrons produced by the arc discharge and receives energy. As a result, the discharge gas is partially excited and partially ionized. The exited discharge gas returns to the ground state or metastable state, thereby emitting light corresponding to the energy difference between the exited state and the returned state. The ionized discharge gas (plasma) recombines with electrons and emits light corresponding to combination energy. Thus, lights expanding substantially in radial directions are produced between the electrodes 15 and 16, and an emission spot S1 is formed between the electrodes 15 and 16. Accordingly, the light source 10 can be considered as a point light source having the light emission point 17 located at the center of gravity of luminance of the emission spot S1.

The first reflector 12 and the second reflector 13 reflect light emitted from the light source 10 and direct the light substantially in the axial direction of the optical axis 1A. The first reflector 12 is disposed in such a position that the light emission point 17 lies between the first reflector 12 and the second reflector 13.

A reflection surface 12a of the first reflector 12 includes a part of a spheroid. This spheroid is a curved surface produced by rotating an ellipse which has one focus at a position almost coinciding with the light emission point 17 and has the major axis direction corresponding to the lamp axis 10A around the lamp axis 10A as the revolution axis of the ellipse. The reflection surface 12a is chiefly located on one of two areas of the spheroid divided along a boundary plane P1 (+Y direction side).

The reflection surface 13a of the second reflector includes a part of a spherical surface. A focus position 13b as the center of this spherical surface almost agrees with the light emission point 17 in the Y direction and Z direction, and shifts from the light emission point 17 in the X direction. Thus, the focus position 13b is positioned within a plane containing the light emission point 17 and crossing the lamp axis 10A at right angles, and located at a position different from the light emission point 17 in this plane. In this embodiment, the chief light receiving portion of the reflection surface 13a is located on one of areas of the spherical surface divided along the boundary plane P1 (−Y direction side). The second reflector 13 is disposed such that the reflection surface 13a is concaved toward the reflection surface 12a of the first reflector 12.

Figure 3A:
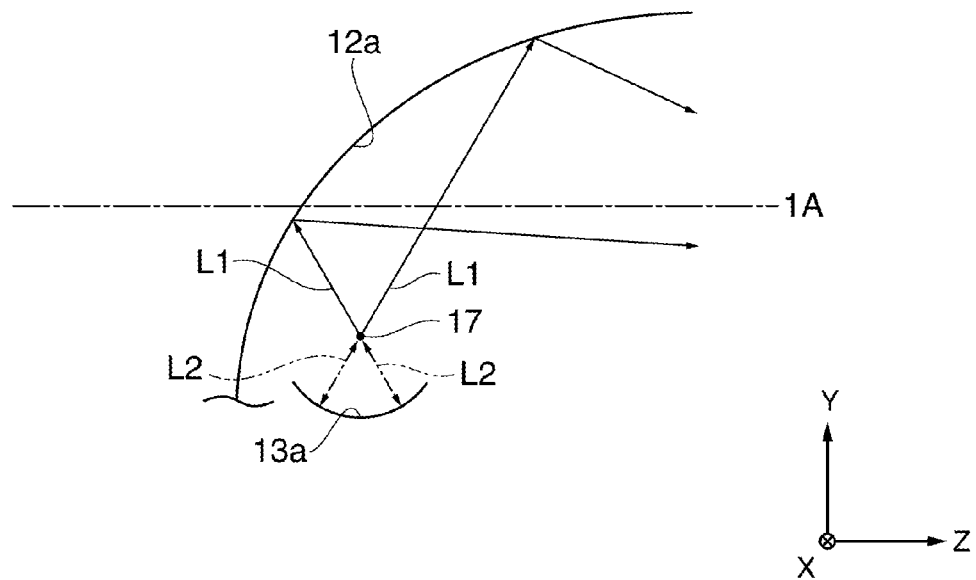
FIGS. 3A and 3B are a side view and a front view, respectively, illustrating light emitted from a light source.
Figure 3B:
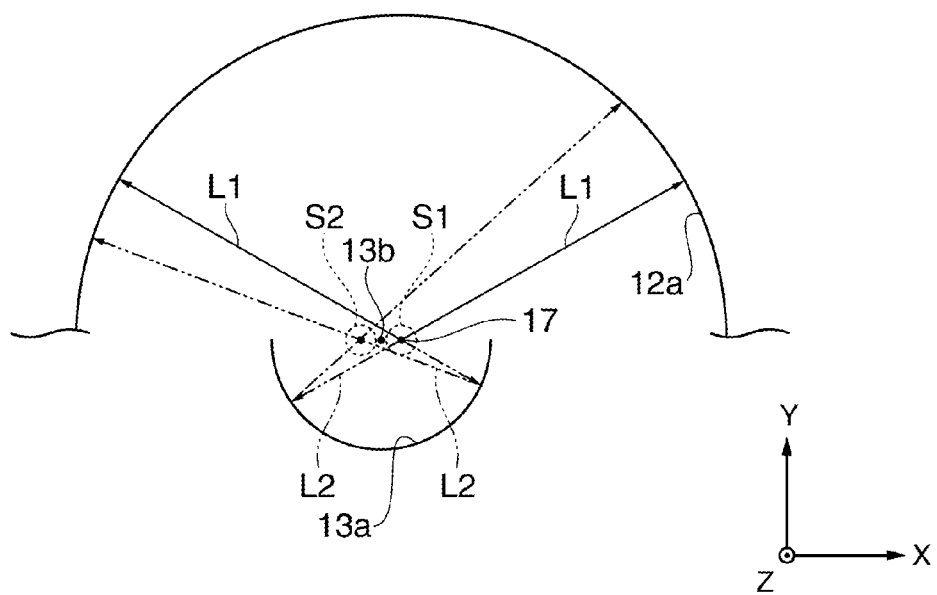

FIG. 3A schematically illustrates a concept of light emitted from the light emission point 17 in correspondence with the cross-sectional view of FIG. 2A. FIG. 3B schematically illustrates a concept of light emitted from the light emission point 17 in correspondence with the front view of FIG. 2B.

As illustrated in FIGS. 3A and 3B, light L1 emitted from the light emission point 17 toward the first reflector 12 is reflected by the reflection surface 12a and converged at a second focus of the spheroid constituting the reflection surface 12a. Light L2 emitted from the light emission point 17 toward the second reflector 13 is reflected by the reflection surface 13a. The light L2 reflected by the reflection surface 13a is converged at a convergence spot S2, and travels toward the first reflector 12. The convergence spot S2 corresponds to an area having the minimum spot size. Thus, the light L2 reflected by the reflection surface 13a of the second reflector 13 and converged substantially at a point has the convergence spot S2 approximately as a point. As illustrated in FIG. 3B, the focus position 13b is located at a position different from the light emission point 17. Thus, the convergence spot S2 is formed at a position shifted from the emission spot S1 within a plane perpendicular to the lamp axis 10A. The light L2 having reached the first reflector 12 is reflected by the reflection surface 12a and extracted to the outside of the light source device 1 together with the light L1.

Figure 4A:
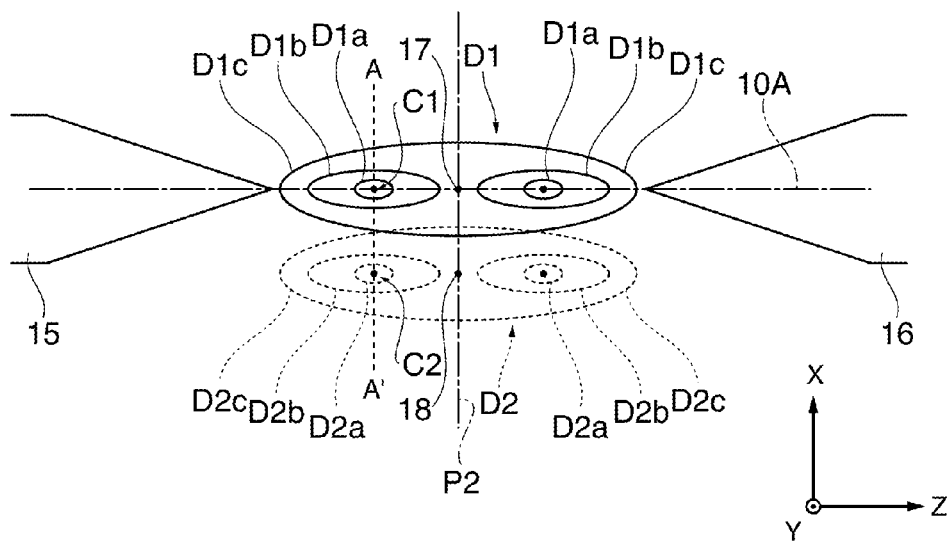
FIG. 4A illustrates a concept showing comparison between a luminance distribution of an emission spot and a luminance distribution of a convergence spot.
Figure 4B:
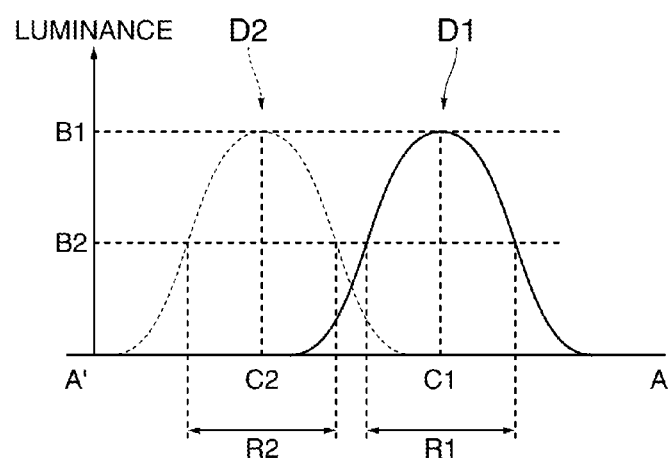
FIG. 4B illustrates a concept of the luminance distributions taken along a line A-A' in FIG. 4A.

FIG. 4A illustrates a concept of comparison between a luminance distribution D1 of the emission spot S1 on an inspection plane and a luminance distribution D2 of the convergence spot S2 on the inspection plane. FIG. 4B illustrates a concept of the luminance distributions D1 and D2 taken along a line A-A' in FIG. 4A. The inspection plane refers to a plane containing a center of gravity of luminance 18 at the convergence spot S2 and the lamp axis 10A, and almost coincides with the boundary plane P1 shown in FIG. 2B in this embodiment. The luminance distribution D1 corresponds to a light source image (arc image) on the inspection plane.

As illustrated in FIG. 4A, the luminance distribution D1 is substantially symmetric with respect to a plane containing the center position between the electrodes 15 and 16 (the light emission point 17) and crossing the lamp axis 10A at right angles (hereinafter referred to as center plane P2). The luminance distribution D1 includes a luminance maximum position C1 as the luminance maximum point at each position between the center plane P2 and the electrode 15 and between the center plane P2 and the electrode 16. An area D1a having relatively high luminance (luminance maximum portion) in the luminance distribution D1 contains the luminance maximum position C1 and lies at each position between the symmetry plane and the electrode 15 and between the symmetry plane and the electrode 16. An area D1b having lower luminance than that of the area D1a is positioned outside each of the areas D1a. An area D1c having lower luminance than that of the area D1b is positioned outside each of the areas D1b. In the luminance distribution D1, the rate of luminance change in the directions perpendicular to the lamp axis 10A (X and Y directions) is higher than in the axial direction of the lamp axis 10A (Z direction).

The luminance distribution D2 of the convergence spot S2 has a distribution pattern approximately similar to that of the luminance distribution D1 and thus can be considered as a distribution corresponding to the luminance distribution D1 shifted in the X direction. An area D2a having relatively high luminance (luminance maximum portion) in the luminance distribution D2 contains a luminance maximum position C2 at the convergence spot S2 and lies at each position between the center plane P2 and the electrode 15 and between the center plane P2 and the electrode 16. An area D2b having lower luminance than that of the area D2a is positioned outside each of the areas D2a. An area D2c having lower luminance than that of the area D2b is positioned outside each of the areas D2b.

As shown in FIG. 4B, the luminance distribution D1 has a luminance maximum B1 at the luminance maximum position C1, and exhibits luminance equal to or higher than a half value B2 (½ of the maximum B1) in a range R1 corresponding to the half value width. The luminance distribution D2 has the luminance maximum B1 at the luminance maximum position C2, and exhibits luminance equal to or higher than the half value B2 in a range R2.

The displacement of the luminance maximum position C2 from the luminance maximum position C1 is larger in the direction in which the rate of luminance change is relatively high (X direction in this embodiment) than in the direction in which the rate of luminance change is relatively low (Z direction) in the luminance distribution D1 of the emission spot S1. The range R2 does not overlap with the range R1. The displacement and the range R2 can be controlled by varying the position and the shape of the reflection surface 13a of the second reflector 13.

It is assumed herein that the distribution patterns and the maximums of the luminance distributions D1 and D2 are the same. However, there is a possibility that the distribution pattern and the maximum of the luminance distribution differ from each other. In this case, it is preferable that the ranges corresponding to the half value widths of the luminance distributions D1 and D2 do not overlap with each other.

According to the light source device 1 having this structure, the range having relatively high luminance in the luminance distribution D2 of the convergence spot S2 does not overlap with the range having relatively high luminance in the luminance distribution D1 of the emission spot S1. Thus, when compared with the structure whose focus position of the reflection surface of the second reflector is located at the same position as the position of the light emission point, a smaller amount of the light L2 reflected by the reflection surface 13a of the second reflector 13 passes through the range having high luminance in the emission spot S1.

According to the light emission theory of the discharge type light source, it is considered that the range having relatively high luminance in the emission spot S1 corresponds to a range having relatively high plasma density at the time of light emission. It is generally known that spectral light corresponding to the plasma composition is absorbed while light is passing through plasma.

In case of the light source device 1, the light L2 travels from the second reflector 13 toward the first reflector 12 while avoiding the area having relatively high plasma density. Thus, the amount of light absorbed by plasma decreases. Accordingly, light loss of the light source device 1 lowers, thereby increasing the light amount without raising power consumption. When the half value width of the luminance distribution D2 of the light L2 reflected by the reflection surface 13a does not overlap with the half value width of the luminance distribution D1 of the emission spot S1, the light amount absorbed by plasma considerably decreases.

In this embodiment, the position of the convergence spot S2 is controlled within the plane containing the light emission point 17 and the lamp axis 10A. In this case, the amount of light blocked by the electrodes 15 and 16 is smaller than that in the structure which controls the position of the convergence spot S2 in the axial direction of the lamp axis 10A. Thus, light can be used with higher efficiency.

The reflection surface 12a of the first reflector 12 surrounds the lamp axis 10A only partially around the light emission point 17, and thus is smaller in size than the full-surrounding type which surrounds the entire circumference around the lamp axis. In this case, light emitted from the light emission point 17 toward the second reflector 13 is reflected by the reflection surface 13a and extracted to the outside via the first reflector 12. Thus, the device can be made smaller than the light source device having the full-surrounding type reflector.

Second Embodiment

A light source device according to a second embodiment of the invention is now described.

Figure 5A:
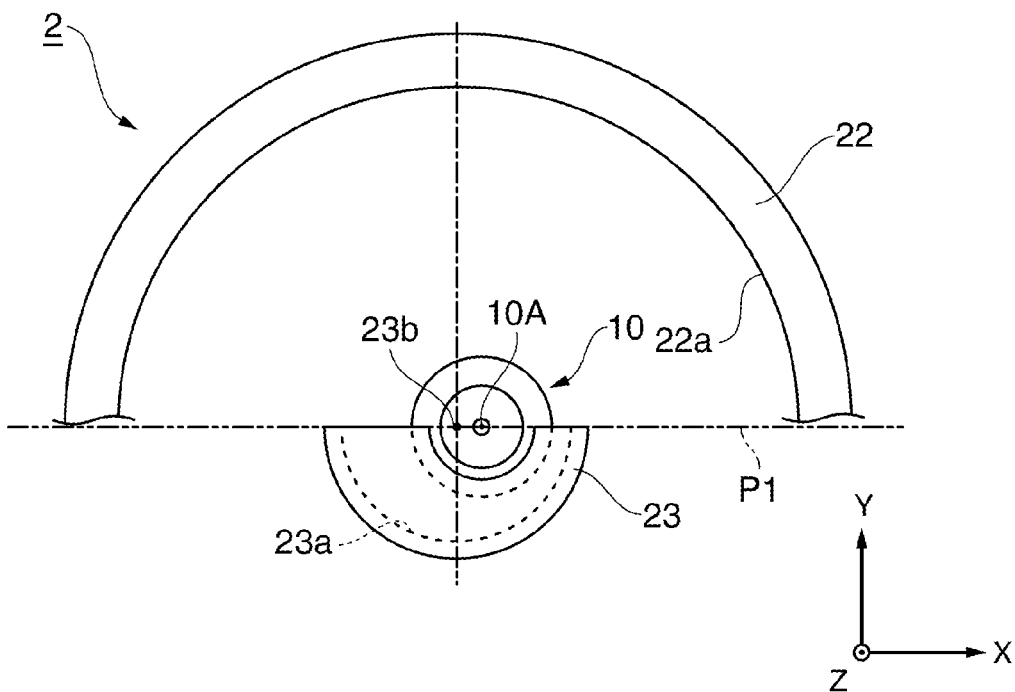
FIGS. 5A and 5B are front views of a light source device according to a second embodiment.
Figure 5B:
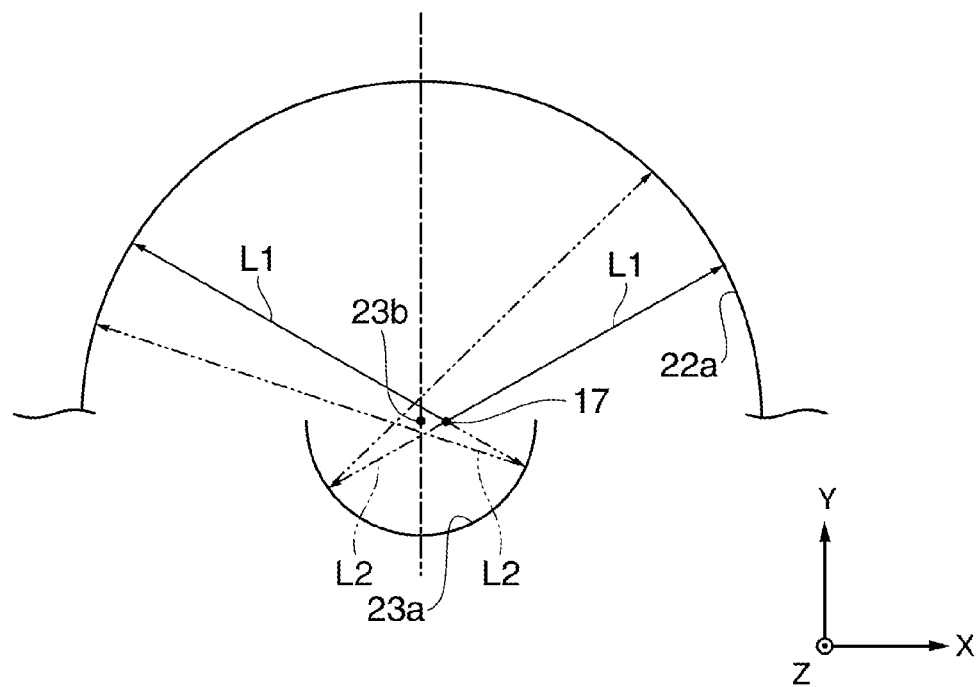

FIG. 5A is a plan view illustrating the positional relationship between the constituent elements of the light source device 2 within a plane perpendicular to the lamp axis 10A in the second embodiment. FIG. 5B schematically illustrates a concept of light emitted from the light emission point in correspondence with the plan view of FIG. 5A.

As illustrated in FIG. 5A, the light source device 2 includes the light source 10, a first reflector 22, and a second reflector 23. The first reflector 22 and the second reflector 23 are similar to the first reflector 12 and the second reflector 13 in the first embodiment. The light source device 2 is different from the light source device 1 of the first embodiment in the positional relationship between the constituent elements. The focus position of a reflection surface 22a of the first reflector 22 almost agrees with a focus position 23b of a reflection surface 23a of the second reflector 23. The focus position 23b within a plane perpendicular to the lamp axis 10A is shifted from the light emission point 17 in the X direction, and almost agrees with the light emission point 17 in the Y and Z directions.

As illustrated in FIG. 5B, the light L1 emitted from the light emission point 17 toward the reflection surface 22a is reflected by the reflection surface 22a and extracted to the outside of the light source device 2. The light L2 emitted from the light emission point 17 toward the reflection surface 23a is reflected by the reflection surface 23a. The light L2 reflected by the reflection surface 23a is converged to a position different from the light emission point 17 to have the minimum spot size at that position, and then reaches the reflection surface 22a. The light L2 having reached the reflection surface 22a is reflected thereby and released in the optical axis direction together with the light L1, and then extracted to the outside of the light source device 2.

The light source device 2 having this structure is compact and produces high-luminance light with low power consumption similarly to the light source device 1 in the first embodiment. In addition, the shape of the reflector constituted by the first reflector 22 and the second reflector 23 is symmetric with respect to the YZ plane containing the focus position 23b. Thus, the symmetry of the luminance distribution of the entire light supplied from the reflector can improve.

Third Embodiment

A light source device according to a third embodiment of the invention is now described.

Figure 6A:
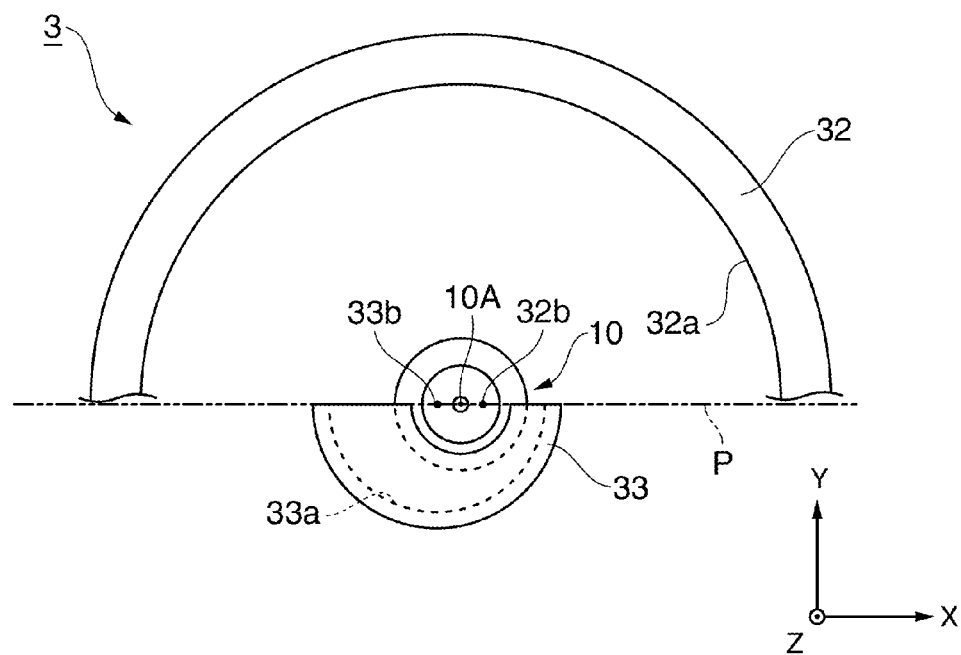
FIGS. 6A and 6B are front views of a light source device according to a third embodiment.
Figure 6B:
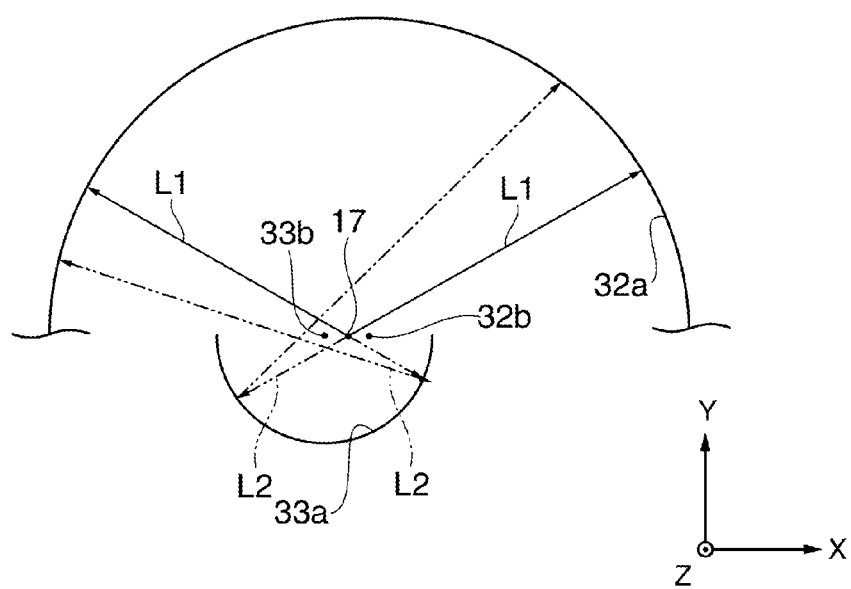

FIG. 6A is a plan view illustrating the positional relationship between the constituent elements of the light source device 3 within a plane perpendicular to the lamp axis 10A in the third embodiment. FIG. 6B schematically illustrates a concept of light emitted from the light emission point in correspondence with the plan view of FIG. 6A.

As illustrated in FIG. 6A, the light source device 3 includes the light source 10, a first reflector 32, and a second reflector 33. The first reflector 32 and the second reflector 33 are similar to the first reflector 12 and the second reflector 13 in the first embodiment. The light source device 3 is different from the light source devices 1 and 2 of the first and second embodiments in the positional relationship between the constituent elements. A focus position 32b of a reflection surface 32a of the first reflector 32, a focus position 33b of a reflection surface 33a of the second reflector 33, and the light emission point 17 within the plane perpendicular to the lamp axis 10A are disposed independently from each other in the X direction, and almost agree with each other in the Y and Z directions.

As illustrated in FIG. 6B, the light L1 emitted from the light emission point 17 toward the reflection surface 32a is reflected by the reflection surface 32a and extracted to the outside of the light source device 3. The light L2 emitted from the light emission point 17 toward the reflection surface 33a is reflected by the reflection surface 33a. The light L2 reflected by the reflection surface 33a is converged to a position different from the light emission point 17 to have the minimum spot size at that position, and then reaches the reflection surface 32a. The light L2 having reached the reflection surface 32a is reflected thereby and released in the axis direction of the optical axis 1A together with the light L1, and then extracted to the outside of the light source device 3.

The light source device 3 having this structure is compact and produces high-luminance light with low power consumption similarly to the light source devices 1 and 2 in the first and second embodiments. In addition, the focus position 32b of the reflection surface 32a, the focus position 33b of the reflection surface 33a, and the light emission point 17 are disposed independently from each other. Thus, the luminance distribution of the entire light emitted from the light source device 3 can be controlled with a higher degree of freedom than in the first and second embodiments.

More specifically, the pattern of the luminance distribution of the light L1 emitted from the light emission point 17 toward the first reflector 32 can be controlled by adjusting the relative positions of the light emission point 17 and the focus position 32b. Similarly, the pattern of the luminance distribution of the light L2 can be controlled by adjusting the relative positions of the light emission point 17 and the focus position 33b. The luminance distribution of the entire light extracted to the outside of the light source device 3 corresponds to the pattern of the overlapped luminance distributions of the lights L1 and L2 which can be individually controlled. Thus, the luminance distribution of the extracted light can be designed with a high degree of freedom.

Fourth Embodiment

A light source device according to a fourth embodiment is now described.

Figure 7A:
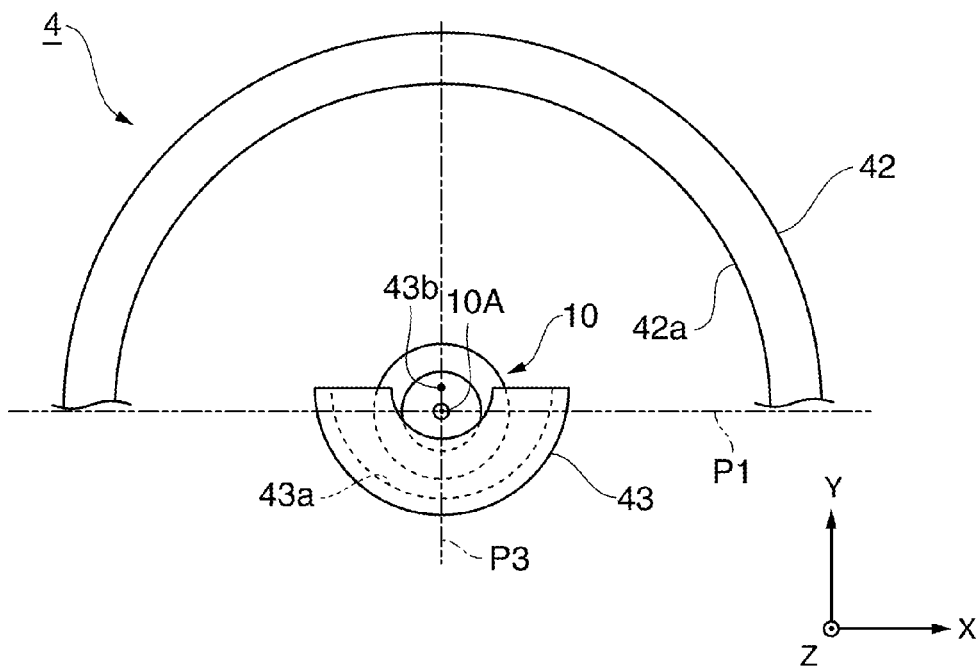
FIGS. 7A and 7B are front views of a light source device according to a fourth embodiment.
Figure 7B:
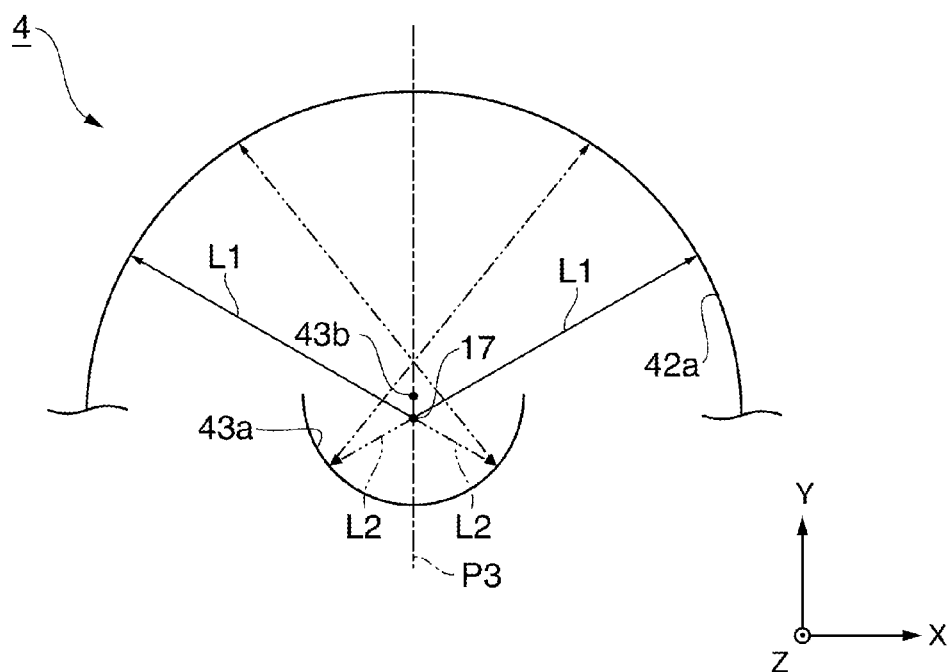

FIG. 7A is a plan view illustrating the positional relationship between the constituent elements of the light source device 4 within a plane perpendicular to the lamp axis 10A in the fourth embodiment. FIG. 7B schematically illustrates a concept of light emitted from the light emission point in correspondence with the plan view of FIG. 7A.

As illustrated in FIG. 7A, the light source device 4 includes the light source 10, a first reflector 42, and a second reflector 43. The first reflector 42 and the second reflector 43 are similar to the first reflector 12 and the second reflector 13 in the first embodiment. The light source device 4 is different from the light source devices 1 through 3 of the first through third embodiments in the positional relationship between the constituent elements. A focus position of a reflection surface 42a of the first reflector 42 almost coincides with a focus position 43b of a reflection surface 43a of the second reflector 43. Thus, the light receiving area of the reflection surface 42a of the first reflector 42 is symmetric with respect to a symmetry plane P3 containing the lamp axis 10A and the focus position 43b. Similarly, the light receiving area of the reflection surface 43a of the second reflector 43 is symmetric with respect to the symmetry plane P3. The focus position 43b in the direction of the plane perpendicular to the lamp axis 10A almost agrees with the light emission point 17 in the X and Z directions, and is shifted from the light emission point 17 in the Y direction.

As illustrated in FIG. 7B, the light L1 emitted from the light emission point 17 toward the reflection surface 42a is reflected by the reflection surface 42a and extracted to the outside of the light source device 4. The light L2 emitted from the light emission point 17 toward the reflection surface 43a is reflected by the reflection surface 43a. The light L2 reflected by the reflection surface 43a is converged to a position different from the light emission point 17 in the Y direction to have the minimum spot size at that position, and then reaches the reflection surface 42a. The light L2 having reached the reflection surface 42a is reflected thereby and released in the optical axis direction together with the light L1, and then extracted to the outside of the light source device 4. The inspection plane in the fourth embodiment, that is, the plane containing the center of gravity of luminance at the convergence spot S2 and the lamp axis 10A almost agrees with the symmetry plane P3. The maximum luminance position of the convergence spot on the inspection plane is shifted from the maximum luminance position of the emission spot in the Y direction.

The light source device 4 having this structure is compact and produces high-luminance light with low power consumption similarly to the light source devices 1 through 3 in the first through third embodiments. In addition, each of the reflection surfaces 42a and 43a is symmetric with respect to the plane containing the focus position 43b and the lamp axis 10A (indicated by alternate long and short dash lines in FIGS. 7A and 7B), and the light emission point 17 lies within this plane. Thus, the luminance distribution of the entire light emitted from the light source device 4 becomes symmetric with respect to this plane.

While the convergence spot S2 is shifted from the emission spot S1 chiefly in the X direction in the first through third embodiments and shifted chiefly in the Y direction in the fourth embodiment, the convergence spot S2 may be shifted in the X or Y direction.

The convergence spot may be located at any position as long as the convergence spot is shifted from the emission spot in the direction of the plane perpendicular to the lamp axis 10A. For example, the convergence spot may be shifted from the emission spot in the direction of the plane perpendicular to the lamp axis 10A and in the Z direction.

According to the fourth embodiment, the focus position of the first reflector 12 almost agrees with the focus position of the second reflector 13. However, these focus positions may be located at different positions. In this case, the focus position of the first reflector 12 may be positioned approximately at the same position as the position of the light emission point 17.

The shape of the reflection surface of the first reflector is not limited to the spheroid but may be other shape such as a part of paraboloid of revolution. In this case, the structure of the optical system for collimating the light released from the first reflector 12 or other structure is changed as necessary.

The shape of the reflection surface of the second reflector may be a free curved surface or aspherical surface concaved toward the first reflector 12. Examples of the free curved surface involve Zernike polynomial surface, x-y polynomial surface, and extended spline surface, and curved surface produced by rotating a free curve such as spline curve and Bezier curve around a revolution axis passing a position different from the light emission point 17 and extending parallel with the lamp axis 10A. Examples of the aspherical surface involve a curved surface expressed by an aspherical surface formula used for representing the shape of an aspherical lens or the like. The shape of the aspherical surface is defined by a shape coefficient in the aspherical surface formula (aspherical surface coefficient). The luminance distribution of light emitted from the light source device can be controlled by adjusting the shape of the reflection surface of the first reflector or the shape of the reflection surface of the second reflector. For example, the symmetry of the luminance distribution can be improved by the adjustment of these shapes.

Fifth Embodiment

An illumination system according to a fifth embodiment of the invention is now described.

Figure 8:
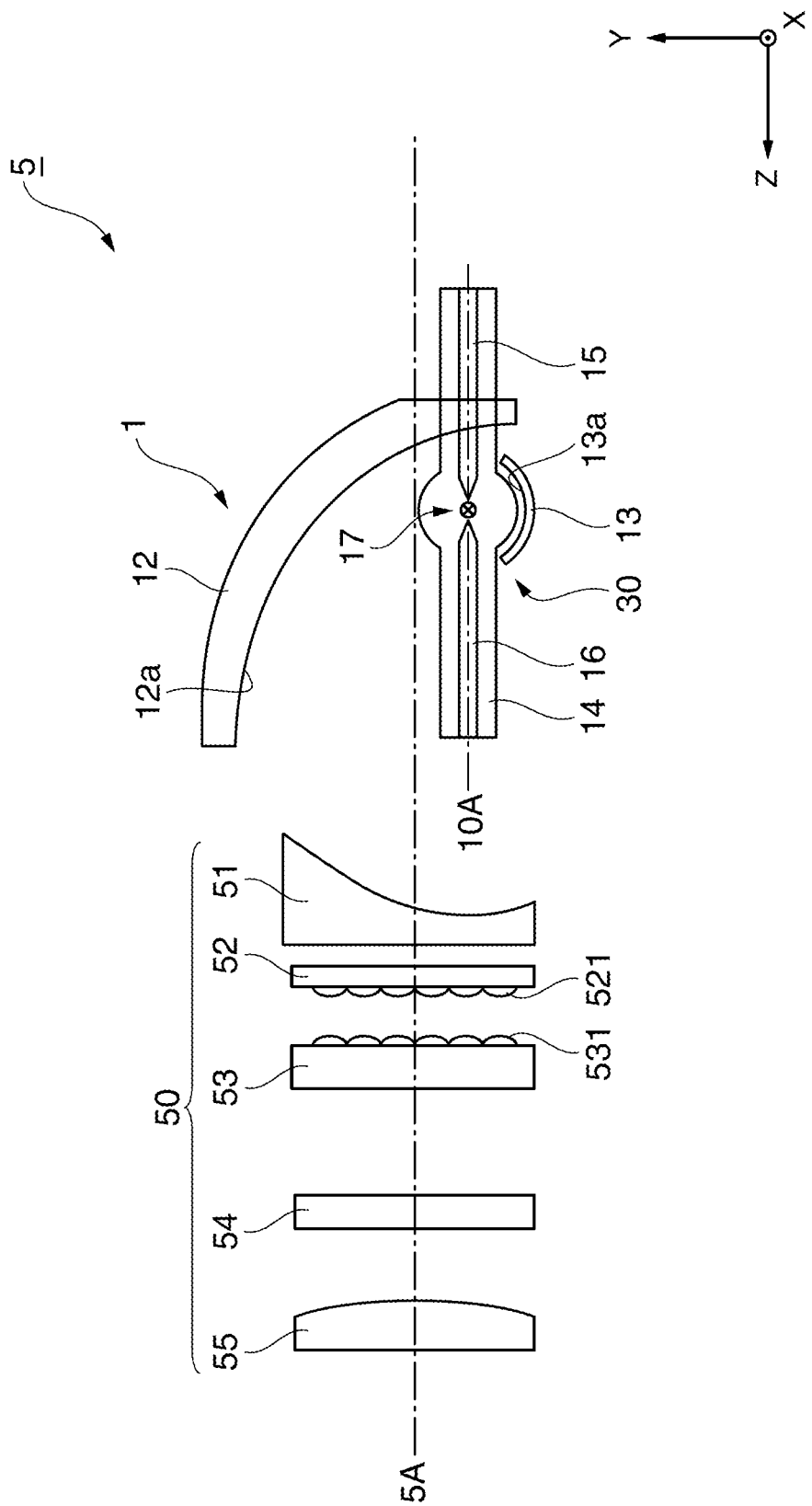
FIG. 8 schematically illustrates the general structure of an illumination system according to a fifth embodiment.
Figure 9:
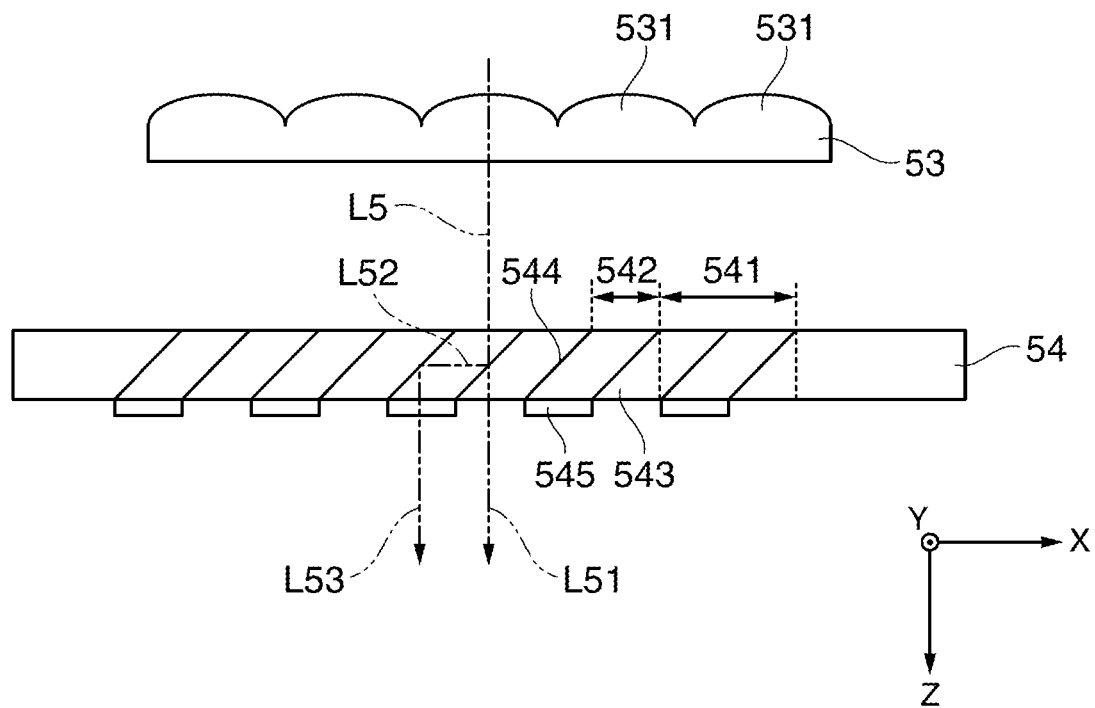
FIG. 9 schematically illustrates an enlarged polarization converting element according to the fifth embodiment.

FIG. 8 is a cross-sectional view schematically illustrating the general structure of an illumination system according to the fifth embodiment. FIG. 9 is a cross-sectional view schematically illustrating an enlarged polarization converting element. As illustrated in FIG. 8, the illumination system 5 includes the light source device 1 and an illumination optical system 50. The constituent elements of the illumination optical system 50 are disposed along an optical axis 5A of the illumination system 5. The optical axis 5A almost agrees with the optical axis of the light source device 1. The illumination optical system 50 includes a collimating lens 51, lens arrays 52 and 53, a polarization converting element 54, and a stacking lens 55 in this order in the downstream direction of the optical axis 5A from the light source device 1.

The collimating lens 51 constituted by a concave lens collimates light emitted from the light source device 1.

The lens arrays 52 and 53 equalize the luminance distribution of light received from the collimating lens 51. The lens array 52 contains a plurality of lenses 521. The lens array 53 contains a plurality of lenses 531. The lenses 521 are disposed in one-to-one correspondence with the lenses 531. The light released from the collimating lens 51 is spatially divided and supplied to the plural lenses 521. The lights entering the lenses 521 form images on the corresponding lenses 531. As a result, secondary light source images are formed on the respective lenses 531.

The polarization converting element 54 equalizes the polarization conditions of lights L5 received from the lens arrays 52 and 53 (see FIG. 9). The polarization converting element 54 contains a plurality of polarization converting cells 541. The polarization converting cells 541 are disposed in one-to-one correspondence with the lenses 531. The lights L5 from the secondary light source images formed on the respective lenses 531 enter entrance areas 542 of the polarization converting cells 541 disposed in correspondence with the lenses 531. Light emitted from the light source device 1 contains light passing through the emission spot S1 and light passing though the convergence spot S2. In this embodiment, the displacement of the luminance distribution D2 from the luminance distribution D1 (displacement in the X direction in the example shown in FIG. 4A) is determined such that the light corresponding to the luminance distribution D2 shown in FIG. 4A does not enter a portion outside the entrance areas of the polarization converting cells.

Each of the polarization converting cells 541 has a polarization beam splitter 543 (hereinafter referred to as PBS film 543) and a phase retardation film 545 in correspondence with the entrance area 542. Each of the lights L5 entering through the entrance area 542 reaches the PBS film 543, where the light L5 is divided into P-polarized light L51 and S-polarized light L52 by the function of the PBS film 543. Either the P-polarized light L51 or the S-polarized light L52 (the S-polarized light L52 in this embodiment) is reflected by a reflection member 544 and enters the phase retardation film 545. The light L52 having entered the phase retardation film 545 is converted into P-polarized light L53 by changing the polarization condition of the light L52 to that of the other polarized light (the P-polarized light L51 in this embodiment) by the function of the phase retardation film 545. Then, the P-polarized light L53 is released together with the P-polarized light L51.

The stacking lens 55 stacks the lights received from the polarization converting element 54 on a light receiving area. Thus, light emitted from the light source device 1 is spatially divided and stacked such that the luminance distribution becomes uniform. As a result, the symmetry around the optical axis 5A improves.

According to the illumination system 5 including the light source device 1 in the embodiment of the invention, illumination light having high brightness can be produced with reduced light loss and low power consumption. In this structure, the displacement of the luminance distribution D2 is determined such that the entire light emitted from the light source device 1 can be supplied to the entrance area of the polarization converting element 54. Thus, light loss produced by light entering a region other than the entrance area of the polarization converting element 54 can be prevented.

Moreover, the light source device 1 is smaller than the structure including the full-surrounding type reflector, and thus the illumination system 5 containing the small light source device 1 becomes compact. In addition, light emitted from the light source device 1 has a spot size of a smaller radius than that of light supplied from the full-surrounding type reflector. Thus, size reduction of the constituent elements of the illumination optical system 50 receiving the light from the light source device 1 can be achieved. Accordingly, the illumination optical system 50 can be made compact, and thus the illumination system 5 can be considerably small-sized.

Sixth Embodiment

A projector according to a sixth embodiment of the invention is now described.

Figure 10:
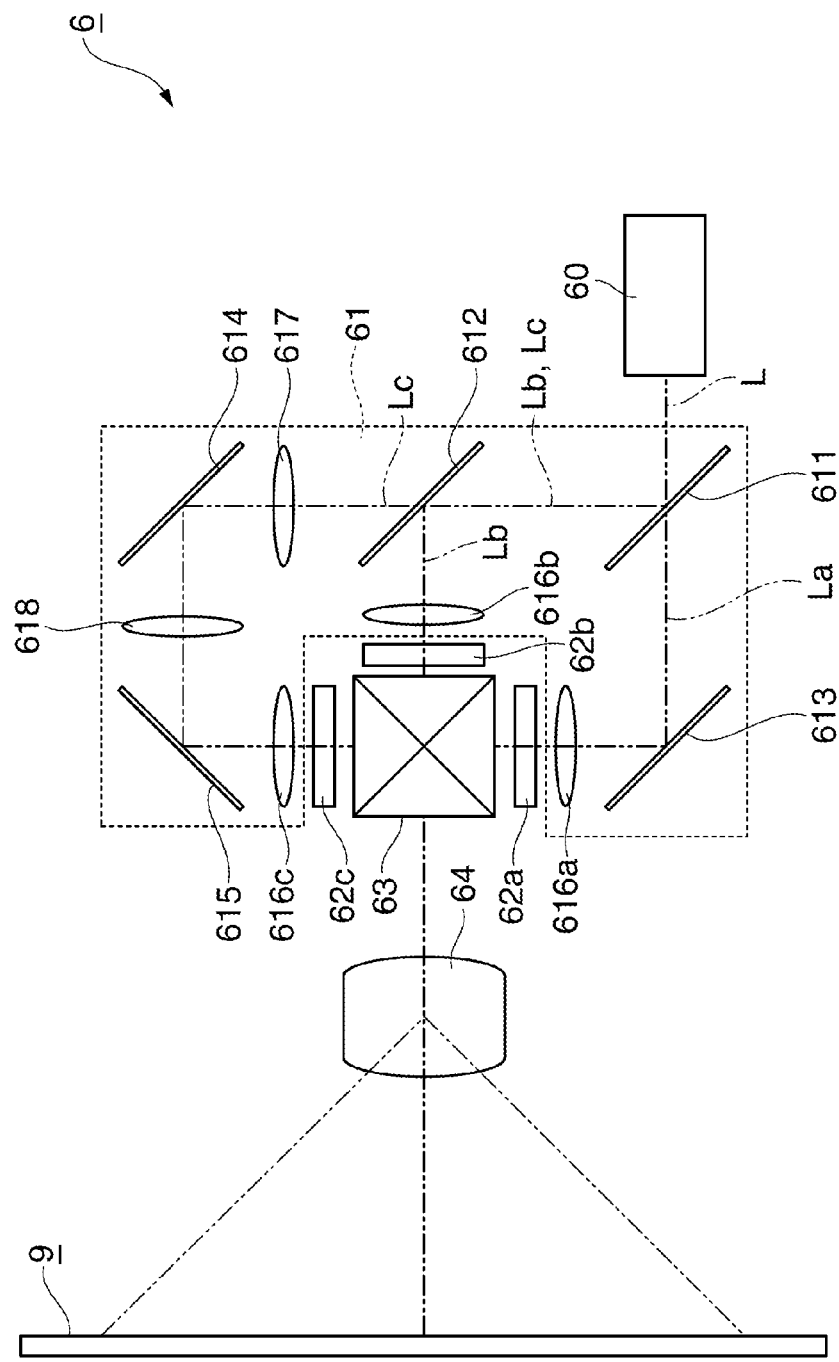
FIG. 10 schematically illustrates the general structure of a projector according to a sixth embodiment.

FIG. 10 schematically illustrates the general structure of a projector 6 according to the sixth embodiment.

As illustrated in FIG. 10, the projector 6 includes an illumination system 60, a color separation system 61, image forming devices 62a through 62c, a color combining element 63, and a projection system 64. The illumination system 60 herein is constituted by the illumination system according to the embodiment of the invention.

The projector 6 generally operates in the following manner. Light emitted from the illumination system 60 is separated into a plurality of color lights by the color separation system 61. The plural color lights separated by the color separation system 61 are supplied to and modulated by the corresponding image forming devices 62a through 62c. The plural color lights modulated by the image forming device 62a through 62c are supplied to and combined by the color combining element 63. The light combined by the color combining element 63 is expanded and projected by the projection system 64 on a projection receiving surface 9 such as a wall and a screen such that a full-color projection image can be displayed. The respective constituent elements included in the projector 6 are now explained.

The color separation system 61 contains dichroic mirrors 611 and 612, mirrors 613 through 615, field lenses 616a through 616c, and relay lenses 617 and 618. Each of the dichroic mirrors 611 and 612 is produced by laminating dielectric multilayer films on a glass surface, for example, and has characteristics for selectively reflecting color light in a predetermined wavelength band and transmitting color light in the other wavelength band. In this embodiment, the dichroic mirror 611 reflects green light and blue light, and the dichroic mirror 612 reflects green light.

Light L emitted from the illumination system 60 enters the dichroic mirror 611. A red light La contained in the light L passes through the dichroic mirror 611 and reaches the mirror 613. The red light La having reached the mirror 613 is reflected by the mirror 613 and enters the field lens 616a. The red light La having entered the field lens 616a is collimated thereat and enters the image forming device 62a.

Green light Lb and blue light Lc contained in the light L are reflected by the dichroic mirror 611 and reach the dichroic mirror 612. The green light Lb having reached the dichroic mirror 612 is reflected by the dichroic mirror 612 and enters the field lens 616b. The green light Lb having entered the field lens 616b is collimated thereat and enters the image forming device 62b.

The blue light Lc transmitted by the dichroic mirror 612 passes through the relay lens 617 and reaches the mirror 614. Then, the blue light Lc is reflected by the mirror 614 and passes through the relay lens 618. The blue light Lc having passed the relay lens 618 is again reflected by the mirror 615 and enters the field lens 616c. The blue light Lc having entered the field lens 616c is collimated thereat and enters the image forming device 62c.

Each of the image forming devices 62a through 62c is constituted by a transmission type liquid crystal light valve or other light modulation device, for example. The image forming devices 62a through 62c are electrically connected with a signal source such as a personal computer for supplying image signals containing image information (not shown). The image forming devices 62a through 62c modulate entering light by pixel according to inputted image signals to form images. The image forming devices 62a through 62c form red image, green image, and blue image, respectively. The lights (images) modulated (formed) by the image forming devices 62a through 62c enter the color combining element 63.

The color combining element 63 is constituted by a dichroic prism or the like. The dichroic prism has four triangle-pole prisms affixed to each other. The affixed surfaces of the triangle-pole prisms become inner surfaces of the dichroic prism. A mirror surface reflecting red light and transmitting green light and a mirror surface reflecting blue light and transmitting green light are provided on the inner surfaces of the dichroic prism in such directions as to cross each other at right angles. The green light having entered the dichroic prism passes through the mirror surfaces and travels to the outside of the dichroic prism without directional change. The red light and blue light having entered the dichroic prism are selectively reflected or transmitted by the mirror surfaces in the same direction as that of the emission direction of the green light. By this method, the three color lights (images) are stacked and combined, and the combined color light is expanded and projected on the projection receiving surface 9 by the function of the projection system 64.

According to the projector 6 which includes the illumination system 60 in the embodiment of the invention, high-luminance illumination lights are applied to the image forming devices 62a through 62c such that high-luminance images can be displayed. In addition, the projector 6 which includes the low power consumption type illumination system 60 also achieves reduction of power consumption.

The illumination system 60 may be an illumination system as a combination of the light source device in the embodiment of the invention and optical systems appropriately selected. While the three-plate-type projector 6 has been discussed in the sixth embodiment, the invention is applicable to a single-plate-type projector. The image forming device may be constituted by a reflection type liquid crystal light valve or a digital mirror device. In this case, the optical systems disposed on the optical path between the light source device and the image forming device, the optical systems disposed on the optical path between the image forming device and the projection system, the projection system and the like are changed as necessary according to the type of the image forming device.

Seventh Embodiment

A projector according to a seventh embodiment of the invention is now described. The seventh embodiment is different from the sixth embodiment in that the luminance distribution of light emitted from the light source device is equalized by an illuminance equalizing element, and that the image forming device is constituted by a digital mirror device (DMD).

Figure 11:
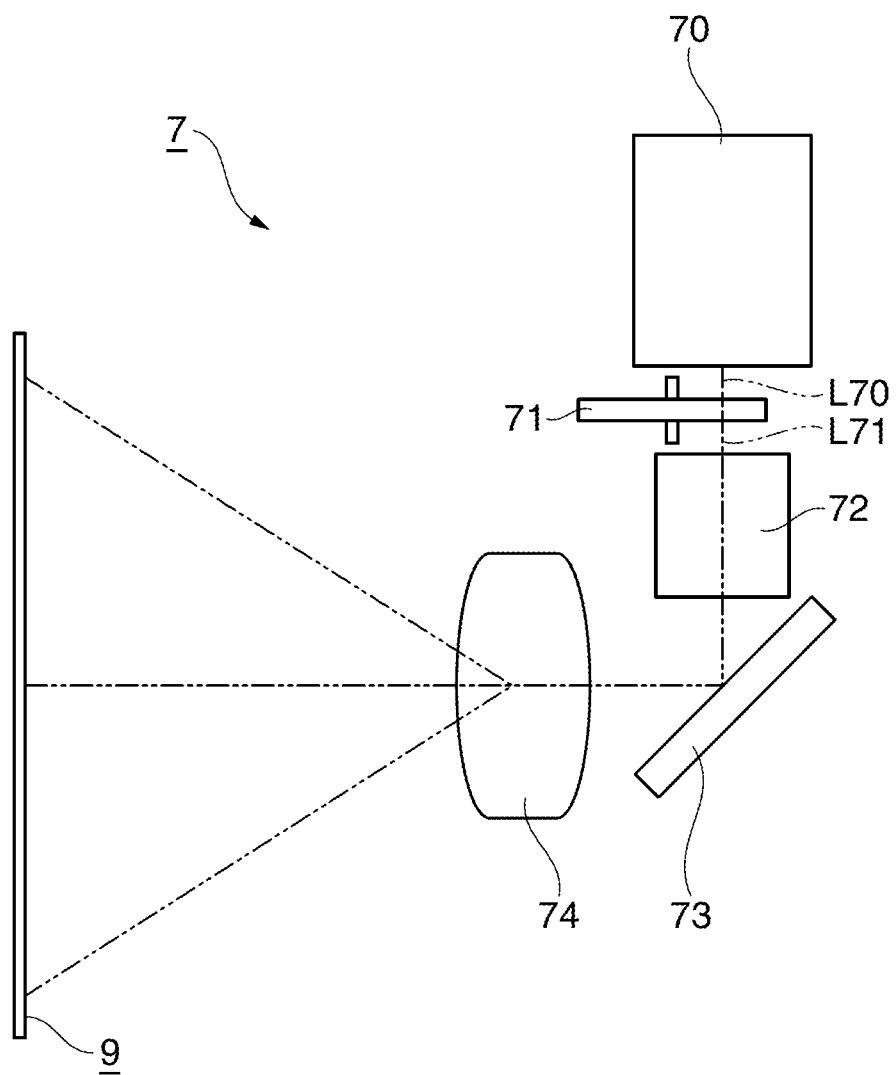
FIG. 11 schematically illustrates the general structure of a projector according to a seventh embodiment.

FIG. 11 schematically illustrates the general structure of a projector 7 in the seventh embodiment. As illustrated in FIG. 11, the projector 7 includes a light source device 70, a color wheel 71, an illuminance equalizing element 72, an image forming device 73, and a projection system 74. The light source device 70 is constituted by the light source device in the embodiment of the invention as a unit for emitting white light L70.

The color wheel 71 contains a disk portion and a rotation support mechanism which supports the disk portion such that the disk portion can rotate. The disk portion has a plurality of fan-shaped color filters. The plural color filters selectively transmit color light in a predetermined wavelength band contained in entering light. The respective wavelength bands corresponding to the plural color filters differ from one another. When the disk portion is rotated, the plural color filters corresponding to the different wavelength bands to be disposed on the light receiving area for receiving light from the light source device 70 are switched by time division. By this method, the wavelength band of light L71 released from the color wheel 71 is switched by time division.

The illuminance equalizing element 72 is constituted by a rod lens or the like and disposed at a position receiving the light L71 from the color wheel 71. The light having entered the illuminance equalizing element 72 is converted into light having uniform luminance distribution, and supplied to the image forming device 73.

The image forming device 73 contains a plurality of movable mirrors independently actuated by pixel. Each angle of the movable mirrors with respect to the optical axis of the light received from the illuminance equalizing element 72 is variable. When the movable mirrors are actuated by switching the angles of the movable mirrors, the traveling directions of the lights reflected by the movable mirrors are switched. Then, pixels are formed by the lights traveling from the movable mirrors toward the projection system 74. In this case, one pixel becomes brighter display as the term for reflecting the entering light toward the projection system 74 occupies a higher proportion in the display period of one frame. Thus, the image forming device 73 can modulate the entering light by pixel.

The image signals supplied from the signal source to the image forming device 73 contain gradation information corresponding to each of the red image, green image, and blue image. The image forming device 73 forms the red image, green image, and blue image by time division in correspondence with the wavelength band of the entering light, i.e., in synchronization with the rotation of the color wheel 71. The red image, green image, and blue image are projected from the projection system 74 to the projection receiving surface 9 by time sequence. The red image, green image, and blue image are combined and visually recognized as display of a full color projection image.

According to the projector 7 having this structure, the light source device 70 is constituted by the light source device in the embodiment of the invention. Thus, high-luminance illumination lights are applied to the image forming device 73 such that high-luminance images can be displayed. In addition, the projector 7 which includes the low power consumption type light source device 70 can achieve reduction of power consumption. Moreover, the light source device 70 and the respective constituent elements disposed on the optical path between the light source device 70 and the projection receiving surface 9 can be small-sized. Thus, the projector 7 can be made considerably compact.

The entire disclosure of Japanese Patent Application No. 2009-133250, filed Jun. 2, 2009 is expressly incorporated by reference herein.

What is claimed is:

1. A light source device comprising:
a light source emitting light;
a first reflector surrounding a part of the light source and reflecting the light emitted from the light source in the direction of an optical axis; and
a second reflector surrounding at least a part of the light source different from the part surrounded by the first reflector and reflecting the light emitted from the light source toward the first reflector,
wherein the second reflector has a spherical shape, and
the position of a convergence spot of the light reflected by the second reflector is displaced from the position of an emission spot of the light source at least in the direction of a plane perpendicular to the direction of the optical axis.

2. The light source device according to claim 1, wherein:
the light source comprises a pair of electrodes disposed away from each other along a predetermined light source axis with the emission spot positioned between the pair of the electrodes; and
the luminance maximum portion of the convergence spot is displaced from the luminance maximum portion of the emission spot on an inspection plane containing the center of gravity of luminance of the convergence spot and the light source axis.

3. The light source device according to claim 2, wherein:
comparing the displacement of the luminance maximum position of the convergence spot from the luminance maximum position of the emission spot in a first direction as one of two directions independent from each other on the inspection plane and that displacement in a second direction as the other direction, the displacement in the first direction having a relatively large rate of luminance change at the emission spot is larger than the displacement in the second direction having a relatively small rate of luminance change at the emission spot.

4. The light source device according to claim 2, a range corresponding a half value width of luminance distribution of the convergence spot does not overlap with a range corresponding to a half value width of luminance distribution of the emission spot on a crossover line along which the plane perpendicular to the light source axis crosses the inspection plane.

5. The light source device according to claim 1, wherein:
a light receiving area of the first reflector for receiving light from the light source is shaped substantially symmetric with respect to a symmetry plane containing a light emission point of the light source;
a light receiving area of the second reflector for receiving light from the light source is shaped substantially symmetric with respect to the symmetry plane; and
the center of gravity of luminance of the convergence spot is displaced from the light emission point within the symmetry plane.

6. The light source device according to claim 1, wherein:
a focus position of the first reflector almost coincides with a light emission point of the light source; and
a focus position of the second reflector is displaced from the focus position of the first reflector.

7. The light source device according to claim 1, wherein:
a focus position of the second reflector almost coincides with a focus position of the first reflector; and
the focus position of the first reflector is displaced from a light emission point of the light source.

8. The light source device according to claim 1, wherein a focus position of the first reflector, a focus position of the second reflector, and a light emission point of the light source are disposed independently from one another.

9. An illumination system comprising:
the light source device according to claim 1;
a luminance equalizing element which contains a plurality of lenses and equalizes luminance distribution of light emitted from the light source device; and
a polarization converting element which contains a plurality of polarization converting cells for equalizing the polarization condition of light received from the luminance equalizing element,
wherein
the lenses are disposed in one-to-one correspondence with the polarization converting cells and converge light passing through the lenses at light entrance areas of the polarization converting cells, and
the displacement of the convergence spot from the emission spot is determined such that light having passed the second reflector and light having entered the first reflector directly from the light source can be supplied to the light entrance areas of the polarization converting cells in the light source device.

10. A projector comprising:
an illumination system including the light source device according to claim 1;
an image forming device which forms an image by using light supplied from the illumination system; and
a projection system which projects the image formed by the image forming device.

11. A projector comprising:
an illumination system according to claim 9;
an image forming device which forms an image by using light supplied from the illumination system; and
a projection system which projects the image formed by the image forming device.

* * * * *